United States Patent [19]
Emma et al.

[11] Patent Number: 6,018,550
[45] Date of Patent: Jan. 25, 2000

[54] METHOD AND APPARATUS FOR TRANSPOSING DIFFERENTIAL SIGNALS ONTO A SET OF BINARY SIGNALS TO INCREASE THE INFORMATION-CARRYING CAPACITY OF THE ORIGINAL SET OF SIGNALS

[75] Inventors: Philip George Emma, Danbury, Conn.; Rajiv Vasant Joshi, Yorktown Heights; William Robert Reohr, Pleasantville, both of N.Y.

[73] Assignee: International Business Machines Corporation, Armonk, N.Y.

[21] Appl. No.: 09/086,155

[22] Filed: May 28, 1998

Related U.S. Application Data

[62] Division of application No. 08/583,301, Jan. 5, 1996.
[51] Int. Cl.[7] ................................................. H04L 25/10
[52] U.S. Cl. ............................................................ 375/317
[58] Field of Search ....................................... 375/316, 317; 328/149; 327/58, 65

[56] References Cited

U.S. PATENT DOCUMENTS

| | | | |
|---|---|---|---|
| 4,820,937 | 4/1989 | Hsieh | 327/71 |
| 5,001,726 | 3/1991 | Kawai et al. | 375/317 |
| 5,373,400 | 12/1994 | Kovacs | 375/317 |
| 5,455,510 | 10/1995 | Nelson | 327/513 |
| 5,811,984 | 9/1998 | Long et al. | 326/30 |

*Primary Examiner*—Tesfaldet Bocure
*Attorney, Agent, or Firm*—F. Chau & Associates, LLP; Kevin M. Jordan

[57] ABSTRACT

A system and method for the superimposition of differential signals on binary signals. The technique can be performed on busses, and in many kinds of storage media. It can be accomplished in many ways depending on the noise that is to be tolerated, and depending on the sophistication of the encoding means.

8 Claims, 13 Drawing Sheets

FIG. 6

| $B_2$ | $B_1$ | $B_0$ | X | Y | $S_0$ | ENCODE | $B_2'$ | $B_1'$ | $B_0'$ | $DE_2$ | $DE_1$ | $DE_0$ |
|---|---|---|---|---|---|---|---|---|---|---|---|---|
| 0 | 0 | 0 | $B_2$ | $B_1$ | 0 | X<Y | 0 | $0^+$ | 0 | 0 | 1 | d |
|   |   |   |       |       | 1 | X>Y | $0^+$ | 0 | 0 | 1 | 0 | d |
| 0 | 0 | 1 | $B_2$ | $B_1$ | 0 | X<Y | 0 | $0^+$ | 1 | 0 | 1 | d |
|   |   |   |       |       | 1 | X>Y | $0^+$ | 0 | 1 | 1 | 0 | d |
| 0 | 1 | 0 | $B_2$ | $B_0$ | 0 | X<Y | 0 | 1 | $0^+$ | 0 | d | 1 |
|   |   |   |       |       | 1 | X>Y | $0^+$ | 1 | 0 | 1 | d | 0 |
| 0 | 1 | 1 | $B_1$ | $B_0$ | 0 | X<Y | 0 | $1^-$ | 1 | d | 1 | 0 |
|   |   |   |       |       | 1 | X>Y | 0 | 1 | $1^-$ | d | 0 | 1 |
| 1 | 0 | 0 | $B_1$ | $B_0$ | 0 | X<Y | 1 | 0 | $0^+$ | d | 0 | 1 |
|   |   |   |       |       | 1 | X>Y | 1 | $0^+$ | 0 | d | 1 | 0 |
| 1 | 0 | 1 | $B_2$ | $B_0$ | 0 | X<Y | $1^-$ | 0 | 1 | 1 | d | 0 |
|   |   |   |       |       | 1 | X>Y | 1 | 0 | $1^-$ | 0 | d | 1 |
| 1 | 1 | 0 | $B_2$ | $B_1$ | 0 | X<Y | $1^-$ | 1 | 0 | 1 | 0 | d |
|   |   |   |       |       | 1 | X>Y | 1 | $1^-$ | 0 | 0 | 1 | d |
| 1 | 1 | 1 | $B_2$ | $B_1$ | 0 | X<Y | $1^-$ | 1 | 1 | 1 | 0 | d |
|   |   |   |       |       | 1 | X>Y | 1 | $1^-$ | 1 | 0 | 1 | d |

FIG. 9

| $K_1$ | $K_2$ | ALLOWED STATES |
|---|---|---|
| 0 | 0 | |
| 0 | $0^+$ | X |
| $0^+$ | 0 | X |
| $0^+$ | $0^+$ | |
| 0 | 1 | X |
| $0^+$ | 1 | |
| 0 | $1^-$ | |
| $0^+$ | $1^-$ | |
| 1 | 0 | X |
| 1 | $0^+$ | |
| $1^-$ | 0 | |
| $1^-$ | $0^+$ | |
| 1 | 1 | |
| 1 | $1^-$ | X |
| $1^-$ | 1 | X |
| $1^-$ | $1^-$ | |

METHOD AND APPARATUS FOR TRANSPOSING DIFFERENTIAL SIGNALS ONTO A SET OF BINARY SIGNALS TO INCREASE THE INFORMATION-CARRYING CAPACITY OF THE ORIGINAL SET OF SIGNALS

This is a division of application Ser. No. 08/583,301, filed Jan. 5, 1996.

FIELD OF THE INVENTION

The invention relates to data transfer and storage, and more particularly to the transfer and storage of digital electronic data signals.

BACKGROUND OF THE INVENTION

A binary signal can represent one of two possible states, called 0 and 1. A set of n binary signals can represent $2^n$ states. An n-bit bus comprises n wires that are used to transmit n binary signals between two elements of a system. An n-bit memory location is used to store an n-bit binary state.

In a computer system, the size of the memory is limited by the number of bits that can be put into a predetermined area. The size of a bus in the system is limited by one of two things:
1) the number of physical pins that can be put into a predetermined area, or 2) the number of drivers that can be switched simultaneously without creating more noise than can be safely tolerated by the system.

In any computer system, it is desirable to have the memory be as large as possible, and the busses be as wide as possible. Since the number of memory cells and the number of wires in a bus are fundamentally limited as stated above, it is clearly useful to use those memory cells and wires to carry more information in some way.

There has been much research to date in which ternary (3-state) signals are the basis for state representation. A ternary signal can represent one of three possible states, called 0, 1, and 2. A set of n ternary signals can represent $3^n$ states. Very clearly, in a ternary system, more information can be stored/transmitted per cell/wire than in a binary system.

There are numerous problems, however, with the practical implementation of a ternary system, some of which are described below. Nonetheless, the plethora of interest in ternary systems clearly demonstrates the perceived usefulness of being able to represent more than binary states in a fixed number of cells or wires.

SUMMARY OF THE INVENTION

The subject invention demonstrates a means and apparatus for doing exactly this, yet it does not have the fundamental implementation problems of a ternary system.

Consider a wire that carries a binary signal from a source driver to a destination receiver. The driver outputs a voltage which represents either of the states {0,1}, and that voltage is propagated along the wire to the receiver. The receiver senses the voltage on the wire, and "interprets" the voltage as one of the states {0,1}.

In practice, 0 Volts represents the state "0" and V Volts represents the state "1". If V is small, then the driver can switch between the "0" and "1" states quickly, which is desirable for performance reasons. The driver will not be able to produce pure 0 and V voltage levels, but instead will produce these levels with some noise superimposed on them. The wire that carries the signal will also pick up noise, and the receiver that senses the signal will have some inherent noise. Therefore, in practice, the receiver must reliably discern $0+\delta(t_1)$ volts from $V+\delta(t_2)$ volts, where $\delta(t)$ is a time-varying signal that is used to model all of the superimposed noise in the system.

The magnitude of $\delta(t)$ is determined by many things within a system, but given a specific system and environment, that magnitude can be considered fixed—or, at least, bounded. Let the magnitude of $\delta(t)$ be denoted by $\Delta$. Then to discern the states "0" and "1" reliably, V must be at least as large as $2\Delta$, i.e., $2\Delta$ is the smallest feasible V. This determines the rate at which the signal can switch (recall that it is desirable to make V as small as possible).

A fundamental problem with a ternary system is that for the receiver to discern three states reliably (where those states are represented by 0, V/2, and V Volts), the smallest possible V is $4\Delta$. This is twice the voltage that is required in a binary system, but is does not yield twice the information density. Therefore, a ternary system is inherently worse than a binary system in this regard.

BRIEF DESCRIPTION OF THE DRAWINGS

FIG. 6 is a truth table for determining differential enables when superimposing one bit on three bits, in accordance with the invention.

FIG. 9 is a table of the signal space for accomplishing dynamic adjustment of a receiver's switching threshold.

DETAILED DESCRIPTION OF THE PREFERRED EMBODIMENTS

Figure 1:
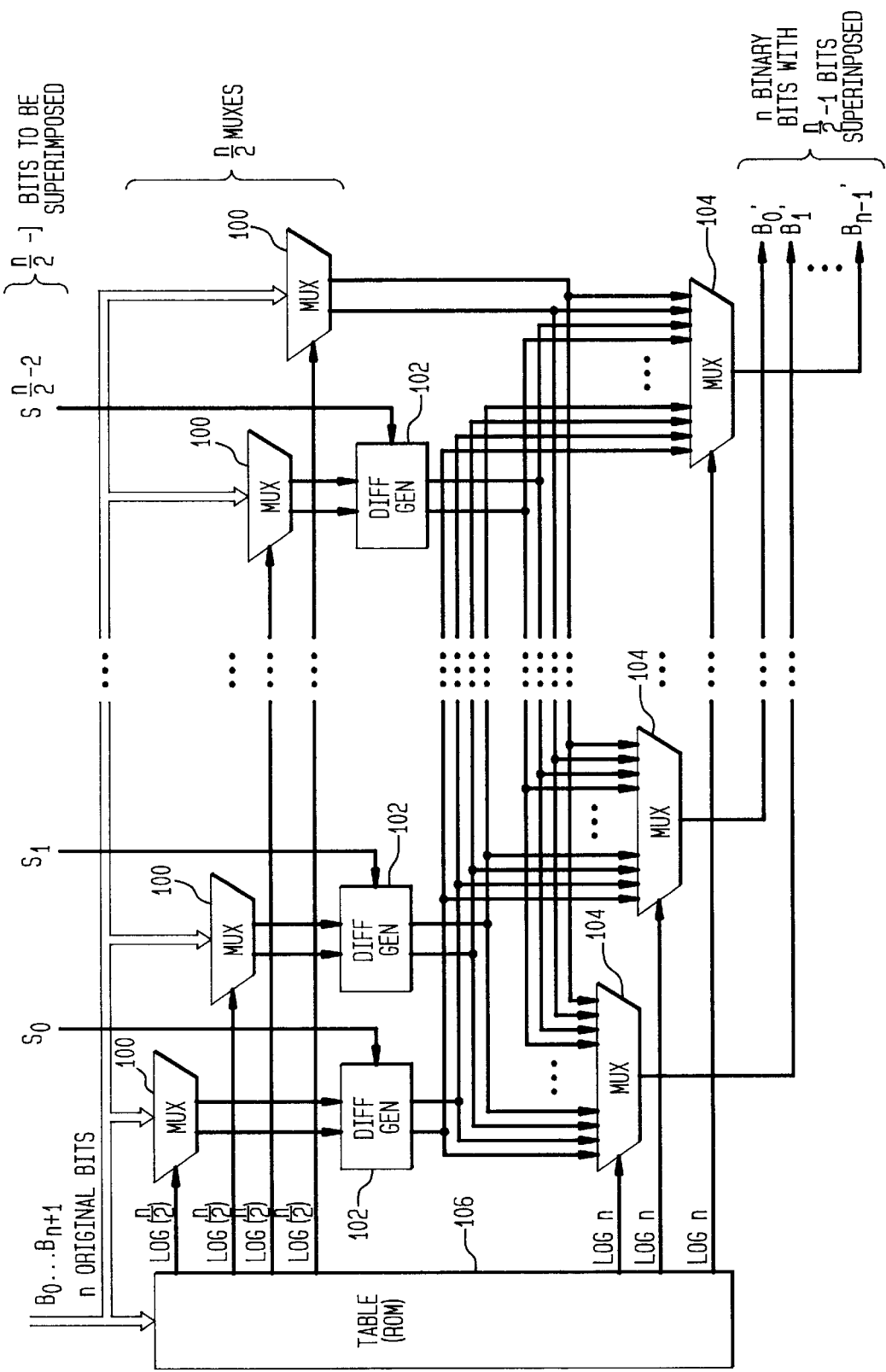
FIG. 1 shows a differential superimposing n-bit driver in accordance with the invention.

The subject invention is a method for superimposing differential signals on a binary bus, and a method for storing differential information within binary data. Very specifically, when two binary signals, a and b are equal, the subject invention provides a method for superimposing a small voltage differential on the pair. The signal pair (a,b) can then be used to represent two different states {(a>b) and (a<b)} when in a pure binary sense, a=b.

To superimpose a small voltage differential, the voltage range must be increased very slightly, but it need not be doubled as is required in a ternary system. This is because the noise function can be considered as the sum of two functions $\delta(t)=\delta_c(t)+\delta_r(t)$, where $\delta_c(t)$ is a "common-mode" noise component, and $\delta_r(t)$ is a "random" noise component.

Common-mode noise accounts for all noise sources that affect all signals (or at least the pair of differential signals) in the system equally. Examples of common-mode noise are power supply noise that affects all (or both) drivers, or coupled noise from an extraneous signal wire where the noise source (wire) crosses all (or both) signal lines in the system. Random noise accounts for all other noise, i. e. , all noise that is not common-mode noise. Most noise is common-mode noise, i. e. , usually $\delta_c(t) \gg \delta_r(t)$.

Let $\Delta_c$ be the magnitude of $\delta_c(t)$, and let $\Delta_r$ be the magnitude of $\delta_r(t)$, Discerning a differential signal reliably does not depend on $\Delta_c$ because $\delta_c(t)$ is added to both signals of the differential pair. It is only $\Delta_r$ that forces the voltage range of the binary bus to be expanded slightly to accommodate a superimposed differential signal.

In the subject invention, a driver can drive a wire to one of 4 voltage levels 0, $0+\Delta_r$, $V-\Delta_r$, or V. These represent the states 0, $0^+$, 1,and 1, respectively. From a binary perspective, the states 0 and $0^+$ are indistinguishable, and the states 1 and $1^-$ are indistinguishable. However, when signals are sent in pairs of signals where binary values of the two signals in a pair are equal, then states $0^+$ and $1^-$ are used to superimpose differential information on the pair.

For example, consider the pair of signals (a,b). In a binary system, this pair can represent one of the four states {(0,0), (0,1), (1,0), (1,1)}. In the subject invention, the pair can represent one of the six states {(0,$0^+$) , ($0^+$,0) ,(0,1),(1,0), ($1^-$,1),(1,$1^-$)}. The states (0,$0^+$) and ($0^+$,0) both represent the binary state (0,0), but the states (a<b) and (a>b) have been superimposed on that state by adding a small differential voltage to either of the signals. Similarly for the states ($1^-$,1) and (1,$1^-$).

In general, consider a system (bus or storage location) containing n bits. If n is even, then $2^{n-1}$ of the possible $2^n$ binary states have an even number of 1's (and therefore, an even number of 0's), so that n/2 pairs of "equal" signals exist. The remaining $2^{n-1}$ states have an odd number of 1's (and therefore, an odd number of 0's), so that (n/2)–1 pairs of "equal" signals exist. If all of the $2^n$ binary states are equally likely, then half of the time n/2 additional bits can be superimposed on the original set of signals, and the other half of the time (n/2)–1 additional bits can be superimposed on the original set of signals via some differential means.

If n is odd, then all of the $2^n$ possible binary states contain (n–1)/2 pairs of "equal" signals. Hence, it is always possible to superimpose (n–1)/2 additional bits on the original set of signals via some differential means.

Figure 2:
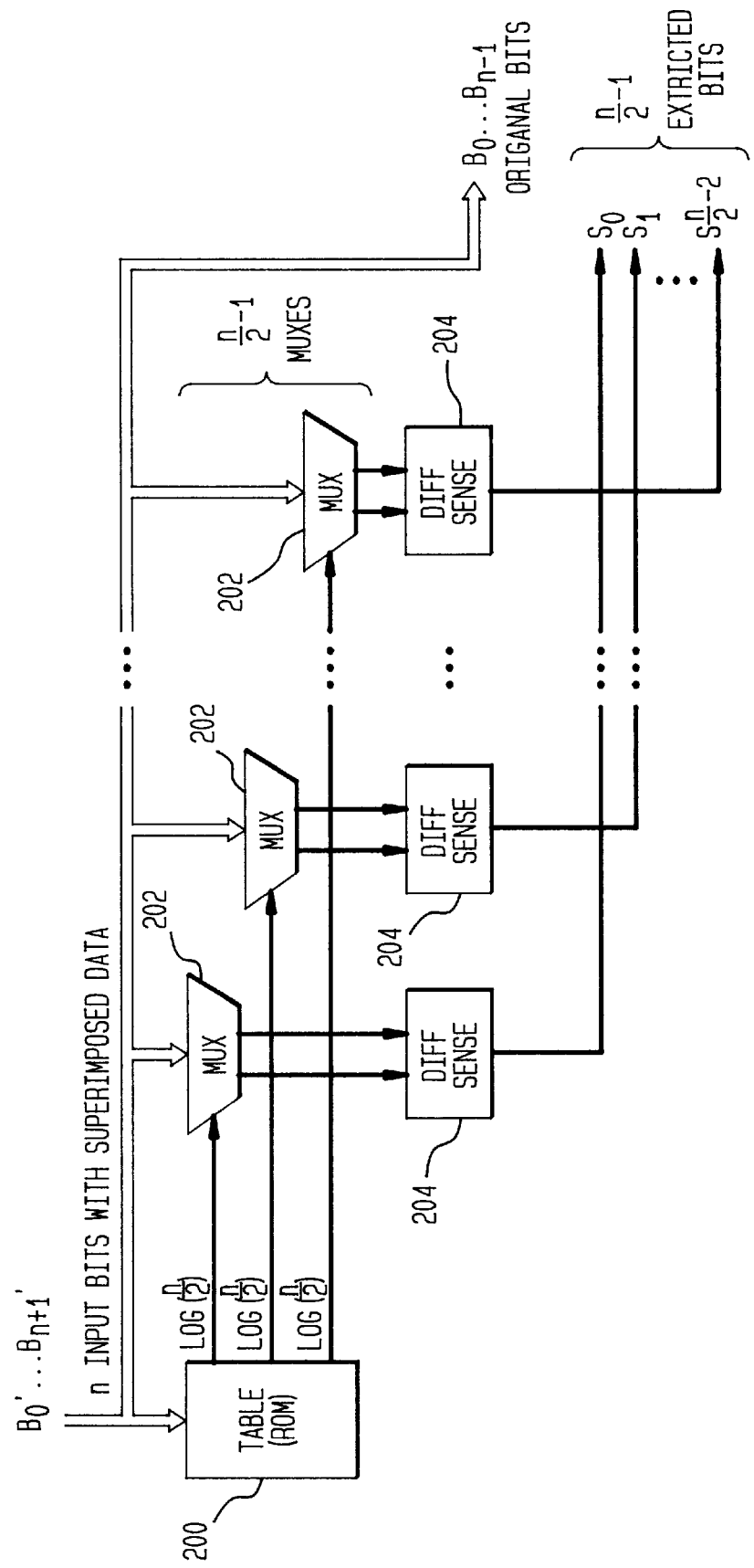
FIG. 2 shows a differential superimposing n-bit receiver in accordance with the invention.

FIGS. 1 and 2 show two possible implementations of this invention for an n-bit bus, where n is even. (If n were odd, the drawings would be nearly identical). These implementations allow for differential signals to be superimposed on arbitrary pairs of binary signals on the bus. As derived above, a n-bit bus can always have (n/2)–1 differential signals superimposed on it, regardless of the values of the original n bits.

FIG. 1 shows the conceptual workings of an n-bit driver. Bits $B_0, B_1, \ldots, B_{n-1}$ are the original n binary inputs. Bits $S_0, S_1, \ldots, S_{(n/2)-2}$ are the (n/2)–1 new bits that are to be superimposed on the original n bits.

The driver includes n/2 multiplexors 100, each of which chooses a unique pair of bits from the original set. The first (n/2)–1 multiplexors choose pairs of equal signals, and the last multiplexor chooses the remaining pair of signals (if n is odd, there is only a single signal remaining). The last pair of signals (when n is even) might or might not be equal, so it is not always possible to superimpose a differential signal on it. Therefore, the 2 outputs of each of the first (n/2)–1 multiplexors are equal.

Each pair of signals from each of the first (n/2)–1 multiplexors drives a differential-signal generator 102. A third input to each of the differential-signal generators is the new bit $S_i$ that is to be superimposed on the pair of equal signals coming from multiplexor i. Since there are (n/2)–1 pairs of equal signals, there are (n/2)–1 new bits that can be superimposed, hence (n/2)–1 differential-signal generators.

The differential-signal generators each produce a pair of equal binary signals (having the same value as the original input binary pair) with a small superimposed voltage differential. The small voltage differential will make one of the two signals slightly larger than the other; the input signal $S_i$ determines which of the two will be larger.

Also, in FIG. 1, there is a set of n multiplexors that put all of the n bits back into their original order. That is, since the first row of multiplexors in FIG. 1 creates pairs of signals based on their binary values (not based on the physical, indexed positions), the signals coming from the row of differential-signal generators are not in the original (indexed) order. Since the receiving end of the bus must "know" that the signal on wire i is binary bit i, this final row of multiplexors is required to recreate the physical correspondence (indexing). Note that this final row of multiplexors preferably are pass-gate (not logic-based) multiplexors, since normal logic circuits will destroy the newly created differential signals. Although it is possible to drive wires through passgates, it is not usually desirable to do so.

The last described element of FIG. 1 is a logic-table 106, which can be (but not necessarily) implemented by a ROM. The table is used to select equal pairs of binary bits based on the input values {$B_i$}, to drive the first row of multiplexors in accordance with that selection, and then to drive the last row of multiplexors to reorder the bits as described above.

The output from FIG. 1 is a binary n-bit bus, with binary bit i being transmitted on wire i, but with (n/2)–1 additional differential signals superimposed on the original set. FIG. 2 shows the corresponding receiving circuitry.

The input to FIG. 2 is a binary n-bit bus, with binary bit i being received on wire i, but with (n/2)–1 presumed additional differential signals superimposed on the original set. The original n binary signals are received and interpreted directly (the bits $B_0, \ldots, B_{n-1}$ that are outputs in this Figure). The function of the circuit of FIG. 2 is to extract the superimposed signals.

The first described element of FIG. 2 is a logic-table 200, which can be (but not necessarily) implemented by a ROM. The table 200 is used to select equal pairs of binary bits based on the input values {$B_i$}, and to drive the row of multiplexors 202 in accordance with that selection. (Note that the multiplexors preferably are passgate multiplexors so as not to destroy the differentials.) This table in FIG. 2 is identical to the first part of the table from FIG. 1, i. e., it must select the same pairs of bits.

The row of multiplexors 202 selects pairs of binary-equal (but with a presumed differential) signals as directed by the aforementioned table. Each chosen pair of signals is sent to a differential-sense amplifier 204. Each differential-sense amplifier senses which of the two inputs is slightly larger, and it outputs a binary 0 or 1 accordingly. These new binary outputs $S_0, \ldots, S_{(n/2)-2}$ are the sensed (n/2)–1 differentially superimposed bits.

Thus, the subject invention can be considered the generic superimposition of differential signals on binary signals. This can be done on busses, and in some kinds of storage media. It can be done in many ways depending on the noise that is to be tolerated, and depending on the sophistication of the encoding means.

Note that when discussing noise margins, the argument is made that adding information via differential means does not greatly impact the noise margin because most of the noise is common-mode noise (i. e., it is the same for both signals in a differential pair). This is most true when those signals are physically adjacent.

Therefore, systems in which differential signals are superimposed only on physically adjacent binary pairs and are transmitted on physically adjacent wires have the best noise characteristics. If the superimposition is not limited to physically adjacent signals and wires, then the noise characteristics are not quite as good, but a superimposition can be done in more cases, i. e., more new information can be superimposed.

The encoding means is simplest if the physical positions of the signals that can have a differential signal superimposed on them is fixed, but the opportunity to do this superimposition is the least in this case. The complexity of the encoding means, and the opportunity for superimposition is greater if the technique is generally applied to physically adjacent (but not predetermined) locations. Finally, the complexity of the encoding means, and the opportunity for superimposition is greatest if the technique is generally applied in an unconstrained way. Therefore, four methods of applying the technique are possible.

Method 1: Differential signals are superimposed on predetermined binary signals $B_i$ and $B_{i+1}$, where i=2j, and j=0, 1, . . . , when signals $B_i$ and $B_{i+1}$ have the same binary value. That is, the superimposition technique is only applied to the binary signal pairs $\{(B_0,B_1), (B_2,B_3), \ldots \}$ when possible. This is the simplest scheme, because the circuitry that generates the differential signal has the smallest number of inputs. However, this scheme does not allow superimposition all of the time. Superimposition can only be done if signals $B_i$ and $B_{i+1}$ are equal in a binary sense. On the average, this is half of the time. Therefore, an n-bit word can have an average of n/4 additional bits superimposed on it. This scheme has excellent common-mode noise characteristics.

Method 2: Differential signals are superimposed on adjacent binary signals $B_i$ and $B_{i+1}$, where i=0, 1, . . . , when signals $B_i$ and $B_{i+1}$ have the same binary value if signal $B_i$ was not already used in conjunction with signal $B_{i+1}$. That is, the superimposition technique is only applied to adjacent signal pairs, but the location of the first signal of the pair is not predetermined. This scheme is slightly more complicated than the previous scheme because the locations that are to be used for superimposition are dependent on the value of the binary data, but it allows more bits to be superimposed on average. Specifically, in a binary string of n bits, the average number of bits that can be superimposed via differential means is n/3. Note that this is an average—the actual number of bits that can be superimposed on an n-bit word depends on the binary value of the word. This scheme also has excellent common-mode noise characteristics.

Method 3: Differential signals are superimposed on arbitrary binary signals $B_i$ and $B_j$ where i≠j when signals $B_i$ and $B_j$ have the same binary value (if signals $B_i$ and $B_j$ were not already used in conjunction with other signals). That is, the superimposition technique can be applied to any signal pair. This scheme is the most complicated scheme because any pairing of signals is possible. The advantage of this scheme is that it guarantees a fixed number of superimpositions regardless of the input data. As discussed previously, this number is (n−1)/2 if n is odd, and (n/2)−1 if n is even. This is the most complex scheme, and the common-mode noise characteristics are not quite as good as the schemes above, but it has the advantage that a fixed number of bits can always be superimposed on another fixed number of bits.

Method 4: Differential signals are superimposed on a fixed set of signals, but the underlying data is represented in a Radix system greater than 2. This allows for a simple implementation as in Method 1 above, but it also allows a fixed amount of additional information to be superimposed on every cycle. This is more detail below.

These four basic methods can be applied in any of the applications described below. Note that when using Method 1 or Method 2, the number of bits that can be superimposed on a fixed other number of bits varies, since it depends on the specific binary values of those bits. When using Method 3, the number of bits that can be superimposed on a fixed other number of bits is fixed—this is the most generic case as was described previously for FIGS. 1 and 2. Method 4 is somewhat different because it does not involve the direct superimposition of a set of bits on another set of bits—rather, the underlying representation of data is changed to accommodate the basic invention. When using Method 4, it is more accurate to say that the information content that is carried by a fixed set of bits is greater than binary, and fixed. The applications means for these methods include Description of a Preferred Driver In this section, circuit techniques are described to realize the invention in a CMOS process. Since a large variety of differential and single-ended receivers exist in the literature (see "The Design and Analysis of VLSI Circuits," by Lance A. Glasser & Daniel W. Dobberpuhl), a person with ordinary skill in the art may choose whatever circuits are best suited to their application.

In FIG. 1, a canonical differential driver 102 was used. This driver has a pair of equal inputs, and it imposes a differential on that pair. Since in the most general application of this invention, the input pair might not have been adjacent signals, a final level of pass-gate multiplexors was required in the general case to reorder the signals.

In this section, a new differential driver is shown. This driver is called a "Voltage-Superimposing Unidriver." This driver has a single input, and it superimposes (or doesn't superimpose) a small predetermined voltage, $V_{diff}$, on that signal in accordance with the state of a control input. It is capable of transforming a "1" into either "1" or "1−", and a "0" into either "0" or "0+".

Note that this is not a generic 4-state system because the underlying assumptions about noise immunity for differential drivers still hold, i.e., $V_{diff}$ can be made very small, and the noise margin is not greatly affected. Very specifically, since this driver is used for multiplicities of bits in the same system and in physical proximity to the other drivers in the system, and since a multiplicity of these drivers drive adjacent wires in the system, the assumptions about common-mode noise hold.

Figure 3:
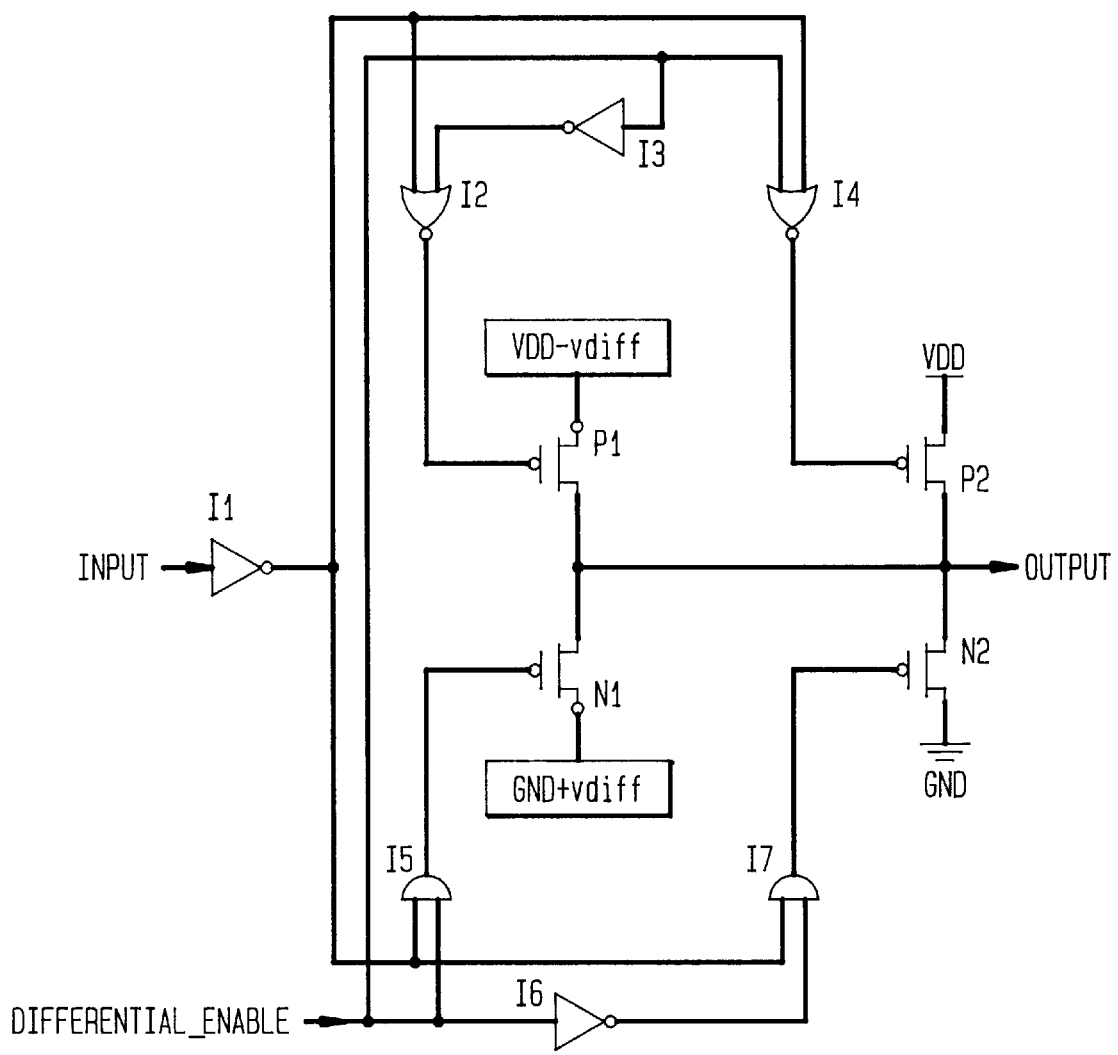
FIG. 3 shows a voltage-superimposing unidriver in accordance with the invention.

An implementation of this new driving circuit is shown in FIG. 3. If the differential enable is active (a "1"), transistors P2 and N2 become inactive, and the output is either pulled to $(V_{dd}-V_{diff})$ by P1 or to $(GND+V_{diff})$ by N1. Likewise, if the differential enable is inactive (a "0"), transistor P1 and N1 become inactive and the output is pulled up to $V_{dd}$ by P2 or down to GND by N2.

Power supplies ($V_{dd}$-$V_{diff}$) and (GND+$V_{diff}$) can be sourced by the addition of two external power supplies, or they can be generated on chip using a switched-capacitor voltage divider, or a diode based voltage divider, etc., as known in the art.

Alternative Embodiment of the Invention

In this section, the Voltage-Superimposing Unidriver (VSU) of FIG. 3 is used to implement an alternative to the embodiment of FIG. 1. The advantage of using VSUs is that they obviate the need for passgate multiplexing at the driver outputs.

Figure 4:
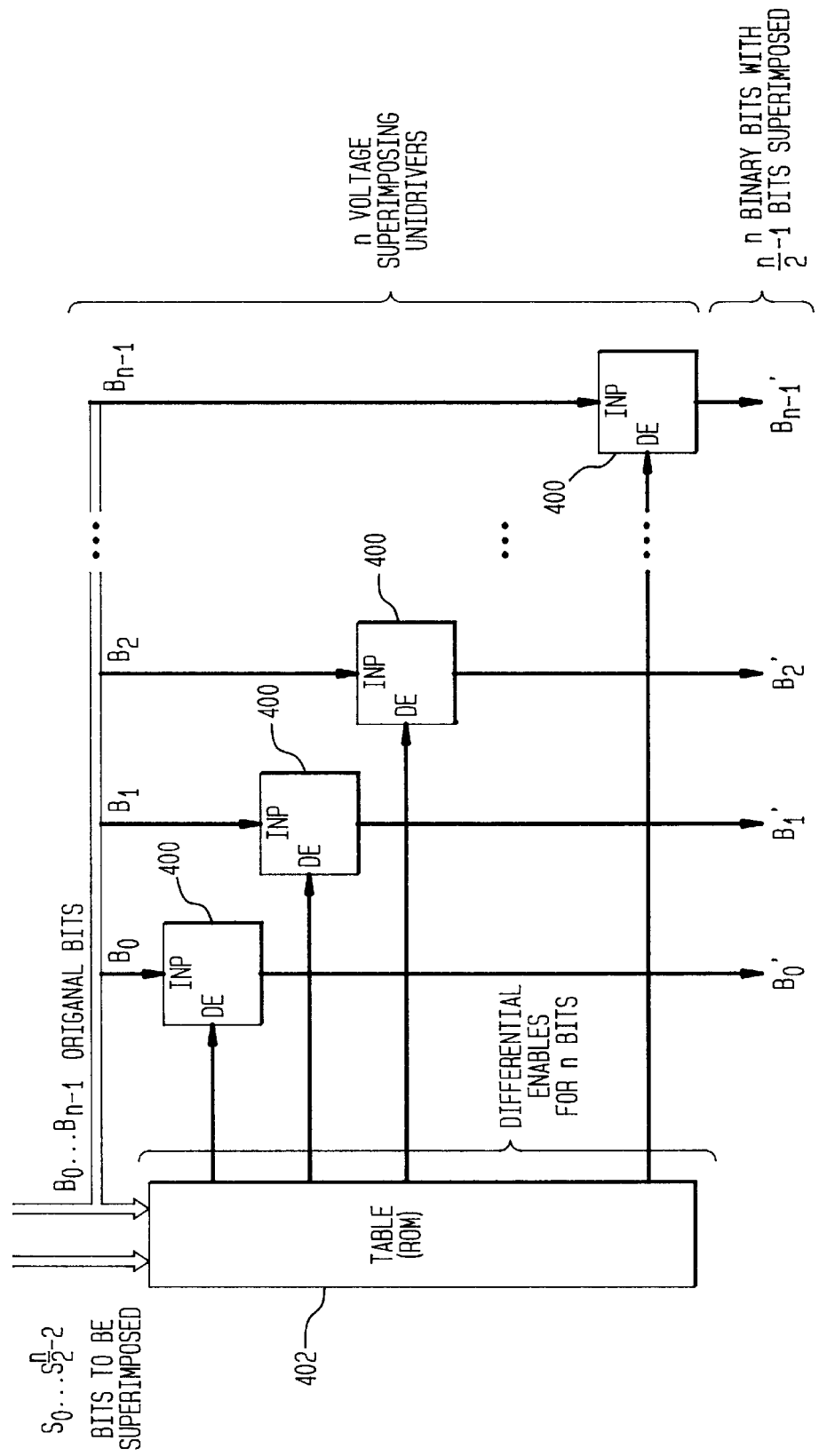
FIG. 4 shows a differential superimposing n-bit driver without passgate outputs, in accordance with the invention.

FIG. 4 shows an implementation of the logical function that was shown in FIG. 1. FIG. 4 shows a Differential Superimposing n-bit driver implemented with VSUs 400, and therefore, without passgates. The table 402 FIG. 4 is preferably implemented with a ROM, but it can also be done with combinational logic, as is shown in the next section.

Functionally, table 402 performs identically to the table 106 in FIG. 1. Based on the values of the inputs $\{B_i\}$, table 402 chooses pairs of equal signals on which to superimpose the inputs $\{S_j\}$. Then, based on the values $\{S_j\}$, it sends "Differential Enable" control signals to the VSUs that appropriately emulate the differentials that were done in FIG. 1, except without reshuffling of the bit order. The driven outputs $\{B_i'\}$ have the same binary values as the inputs $\{B_i\}$, but the additional bits $\{S_j\}$ have been encoded into the original signals in the form of differential voltages.

Figure 5:
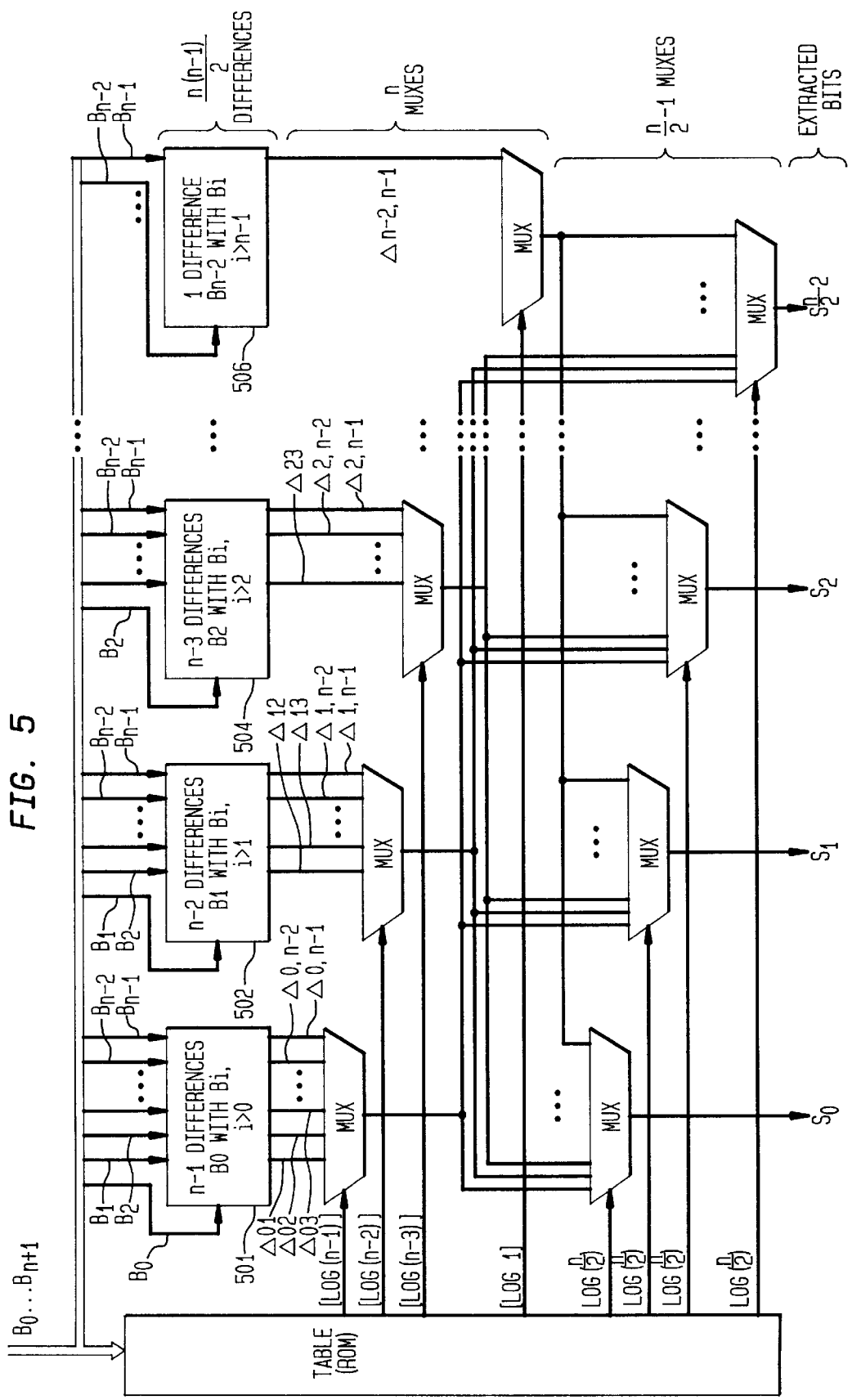
FIG. 5 shows a differential superimposing n-bit receiver without passgate inputs, in accordance with the invention.

FIG. 2 could be used as the corresponding receiver for the driver in FIG. 4. Recall that the receiver in FIG. 2 has passgates on the inputs. If this is undesirable in a given application, FIG. 5 shows a functionally equivalent receiver without passgates on the inputs that could be used instead. The drawback of the receiver in FIG. 5 is that the inputs drive n loads.

The first row of circuits in FIG. 5 is a set of ($_2^n$) differential sense amplifiers 500, 502, 504 . . . 506 that form all possible differences between the n inputs. The table 508 is the functional equivalent of table 402 in FIG. 4.

Based on the binary values of the inputs, table 508 chooses the relevant pairs of signals that should have differences superimposed on them, and it selects the appropriate (n/2)−1 differences by sending appropriate control information to the multiplexors. The outputs from the final row of multiplexors are the binary form of the previously superimposed bits $\{S_j\}$.

Superimposing 1 Bit onto 3 Bits

In this section, the specific case of superimposing 1 bit onto 3 bits is shown. Recall that if n is odd (3 in this case), it is always possible to superimpose (n−1)/2 bits (1 in this case) on the original set. Very simply, given any 3 bits, at least two of them have the same binary value.

In this example, the FIG. 4/FIG. 5 implementation is used (arbitrarily). Let the original 3 bits in this example be called $B_2$, $B_1$, $B_0$, and let the bit that is to be superimposed be called $S_0$.

Recall that FIG. 3 showed the schematic for a VSU, and that the VSU had a "Differential Enable" (DE) control input. If the DE input was high, the VSU superimposes a small voltage differential $V_{diff}$ on the input signal. FIG. 6 shows a truth-table that was used to determine the three DE inputs to the three VSUs based on the values of $B_2$, $B_1$, $B_0$, and $S_0$.

The first three columns of FIG. 6 are the original values of $B_2$, $B_1$, and $B_0$. The next two columns are labeled X and Y, and a particular pair ($B_i,B_j$) is assigned to (X,Y) in each row. The difference that is to be formed is a difference between X and Y; the pair ($B_i,B_j$) is an arbitrary choice as long as $B_i=B_j$.

The next column is the value of the new bit $S_0$, and the next column, labeled "Encode" shows the direction of the difference (X<Y; or X>Y) that is used to represent the value of $S_0$, either 0 or 1, respectively.

Given the selection (X,Y)=($B_i,B_j$), and given the direction of the difference (X<Y or X>Y) the next three columns show the signals ($B_i'$) that need to be formed to superimpose $S_0$ on the original set $\{B_i\}$.

The final three columns show the DE inputs to the VSUs that are required to form the signals $B_i'$. For the $B_i$ that is not used in the difference (i.e., the signal that is not assigned to X or to Y), the DE input is a "don't care" (d). Of the remaining two DEs, one of them must be a 0, and the other must be a 1. The $B_i$ that has the voltage superimposed on it (i.e., 0+ or 1−) must have DE=1, and the $B_j$ that does not have the voltage superimposed on it (i.e., 0 or 1) must have DE=0.

Figure 7:
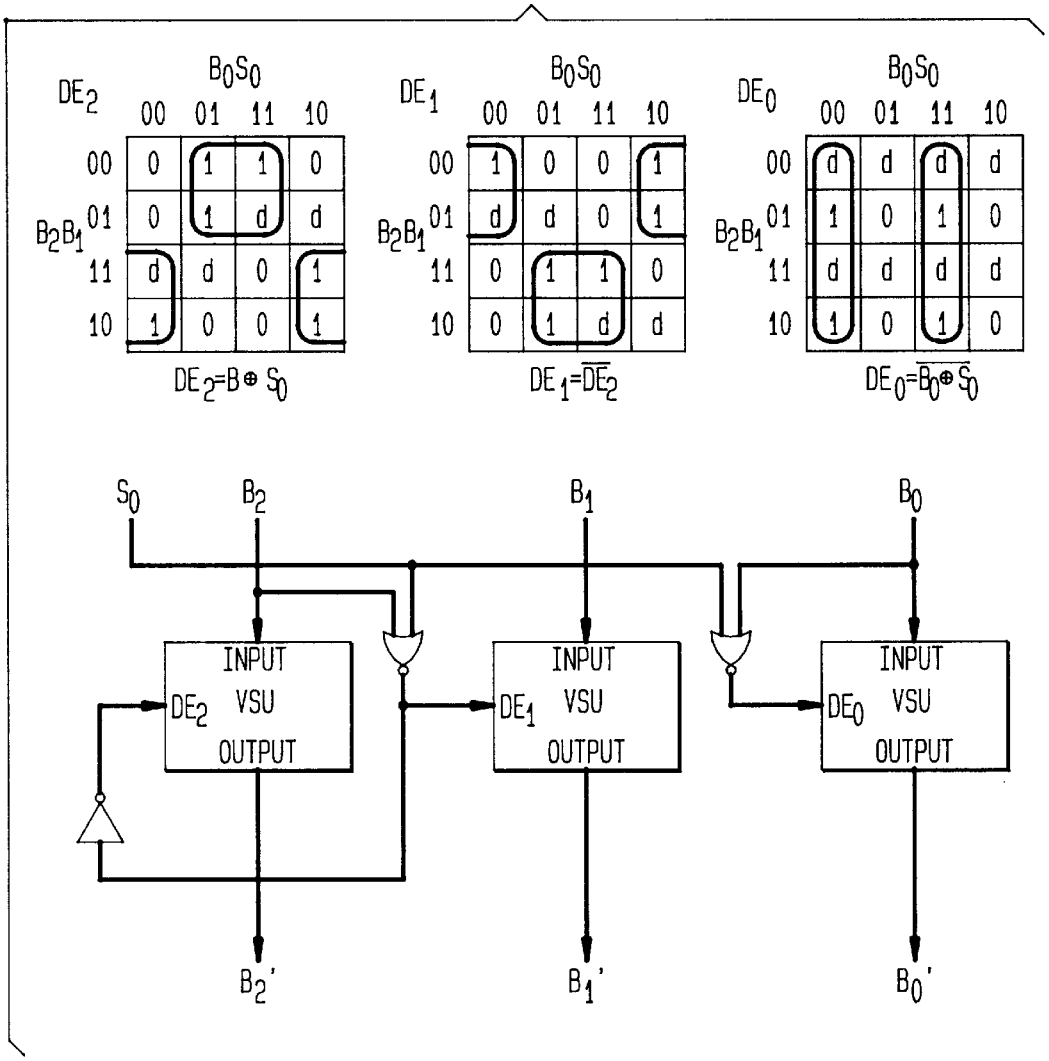
FIG. 7 shows Karnaugh maps and a resulting differential superimposing 3-bit driver, in accordance with the invention.

FIG. 7 shows the Karnaugh maps for the three DE inputs that were determined in FIG. 6, and the resulting differential superimposing 3-bit driver with VSUs. Note that the DE functions were all simple (XORs in all cases), so combinational logic was used instead of a table (ROM).

Figure 8:
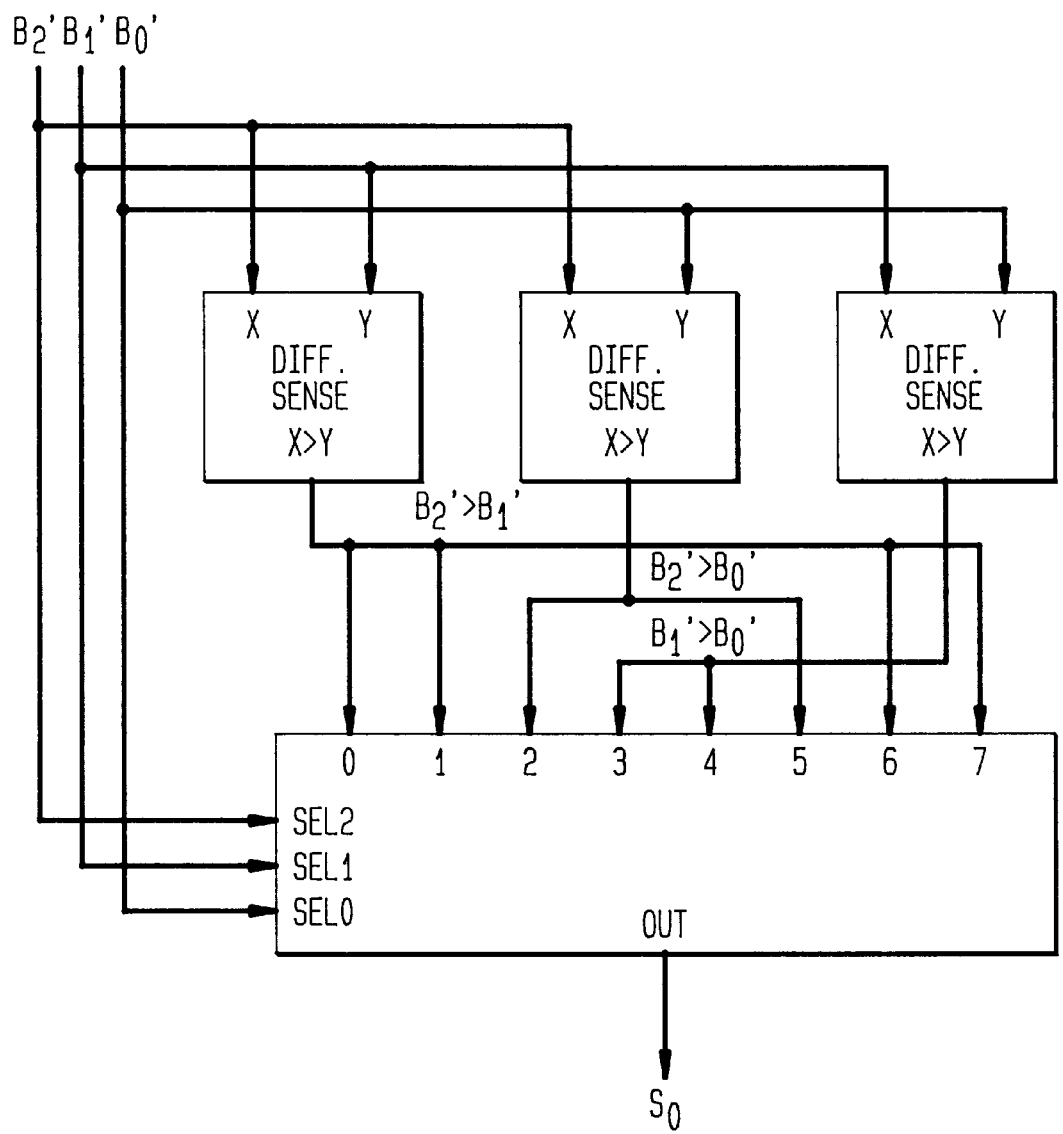
FIG. 8 shows a differential superimposing 3-bit receiver in accordance with the invention.

FIG. 8 shows the corresponding differential superimposing 3-bit receiver implemented in the style of FIG. 5. The three differential-sense amplifiers form the three possible differences. A multiplexor chooses the appropriate difference based on the values $\{B_i'\}$. The appropriate choices can be read directly from the first five columns of FIG. 6.

Using Radices Greater Than 2 in Accordance with Method 4

Consider a system of n=a×b bits, where a and b are integers, i.e., n is decomposed into a packets, each containing b bits. In this invention, each packet of b bits is used to represent a number of states S, where $S>2^b$. The total number of states in the system is then $S^a$ which is greater than $2^n$.

For example, in the preceding Section, it was shown that two bits could be used to represent six states (instead of only four). This was done by superimposing a differential on the pair in either of two ways when the pair was "equal" in a binary sense. Specifically, the single binary state (0,0) was decomposed into the two states (0,0+) and (0+,0), and the single binary state (1,1) was decomposed into the two states (1−,1), and (1,1−).

Let n=a×2, i.e., let b=2, and let n be decomposed into a packets, each containing two bits. If each of the a packets represents one of six states (i.e., if the data is expressed in Radix-6), then the total information that can be represented is $6^a=2^a \times 3^a$ Note that in pure binary, $2^n=2^{2a}=2^a \times 2^a$, so the Radix-6 representation clearly allows for more states.

As b is increased, the Radix increases, and the total number of states that can be represented by the same n bits also increases. (For example, when b=3, the radix is 16.) But as b is increased, the complexity of the circuitry required to choose which pairs of signals to make differential, and the circuitry required to make the chosen pairs of signals differential becomes more complex. Therefore, the choice of b is at the discretion of a designer, and it does not limit the scope of the invention.

Dynamically Shifting Thresholds at the Receiver

Figure 10:
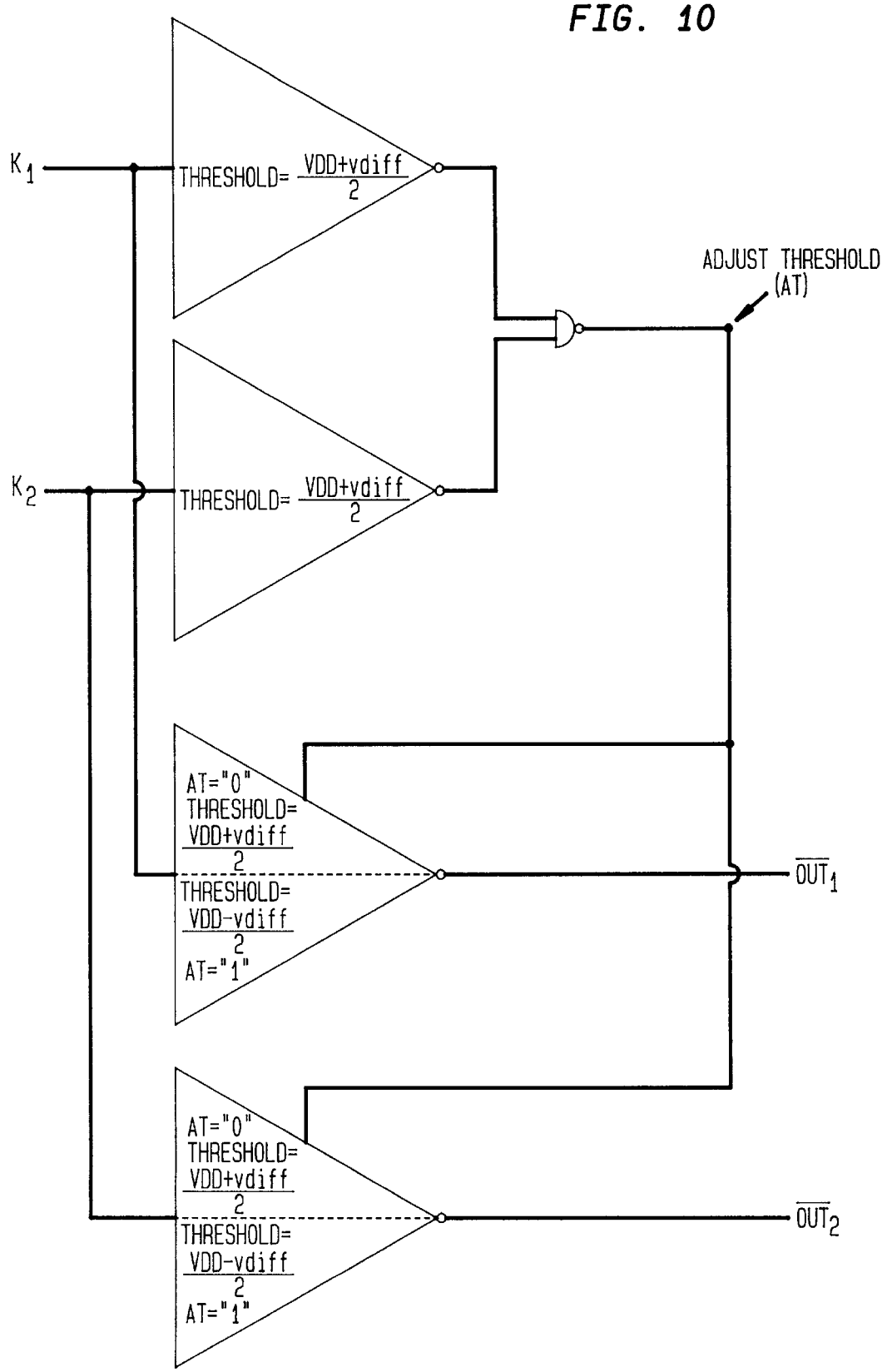
FIG. 10 shows an implementation of an adjustable threshold circuit in accordance with the invention.

The switching threshold of a receiver can be dynamically adjusted to maximize available signal noise margin. To implement this feature, the signal space must be confined as shown in FIG. 9. In addition, adjustable threshold circuits must be implemented as shown in FIG. 10. The first two columns of FIG. 9, labeled k1 and k2 respectively, designate all potential signal combinations in a two-wire system.

The available noise margin is improved by confining the state space such that if any form of a one appears (either 1 or 1−) on a signal wire, a high one (1) must be present within the pair. The analogous rule holds for zeros (0 and 0+). That is, if any form of a zero appears (either 0 and 0+) on a signal wire a low zero (0) must be present within the pair. The resulting allowed signals have an X beside them in the third column.

With this limited state space, circuit 1 of FIG. 10 can detect the presence of a 1 occurring in a wire pair with a noise margin equal to $(V_{dd}-V_{diff})/2$. Detection of a 1 rules out the possibility of a 0⁻ in the signal pair. Therefore, the Boolean receiver's signal threshold can be adjusted to $(V_{dd}-V_{diff})/2$, which ensures that all signal combinations have a noise margin of at least $(V_{dd}-V_{diff})/2$.

Figure 11:
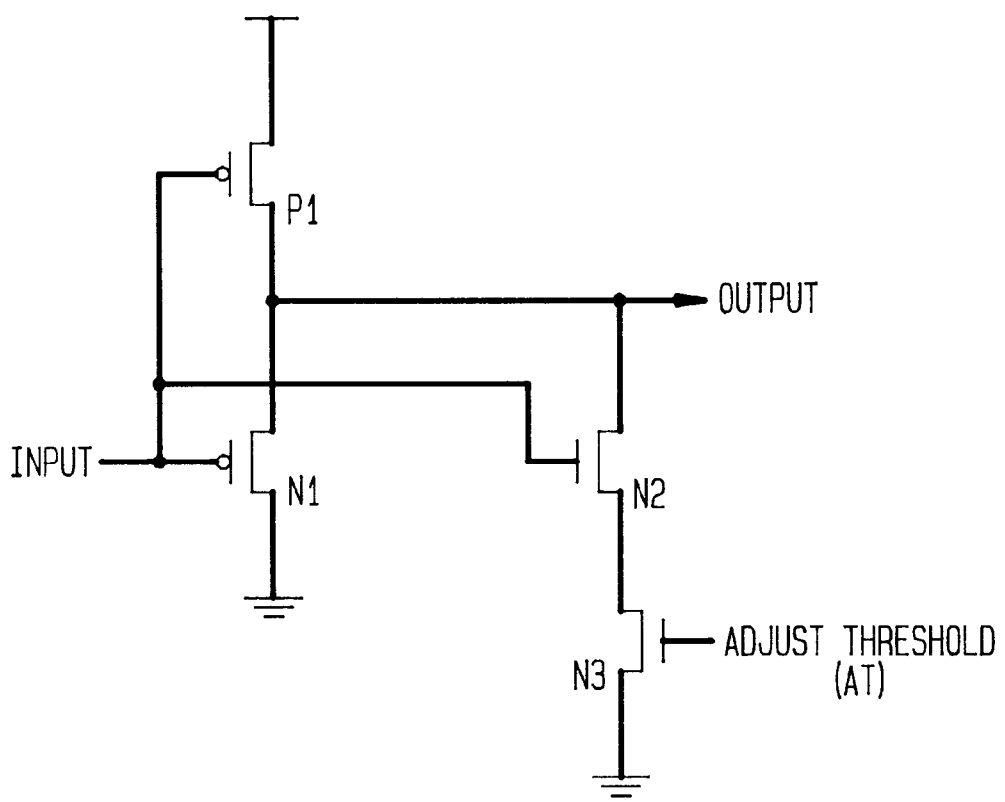
FIG. 11 shows an adjustable receiver circuit in accordance with the invention.

One way to build a receiver with an adjustable threshold is shown in FIG. 11. In this circuit there are two separate pulldown paths one through N1, and the other through N2 in combination with N3. The "AT" control enables or disables the pulldown path through N2 and N3.

When AT is low, P1 is sized with sufficient strength to overwhelm N1. The disproportionate sizes of P1 and N1 drive the inverter's input threshold higher. When AT is high, the pulldown section of the inverter (comprising N1, N2, and N3) is sized with sufficient strength to overwhelm P1. The inverter now switches at a lower threshold.

The switching threshold of the circuit is controlled by tuning the strength of the pulldown and pullup section of the inverter.

"Analog" memory cell

Figure 12:
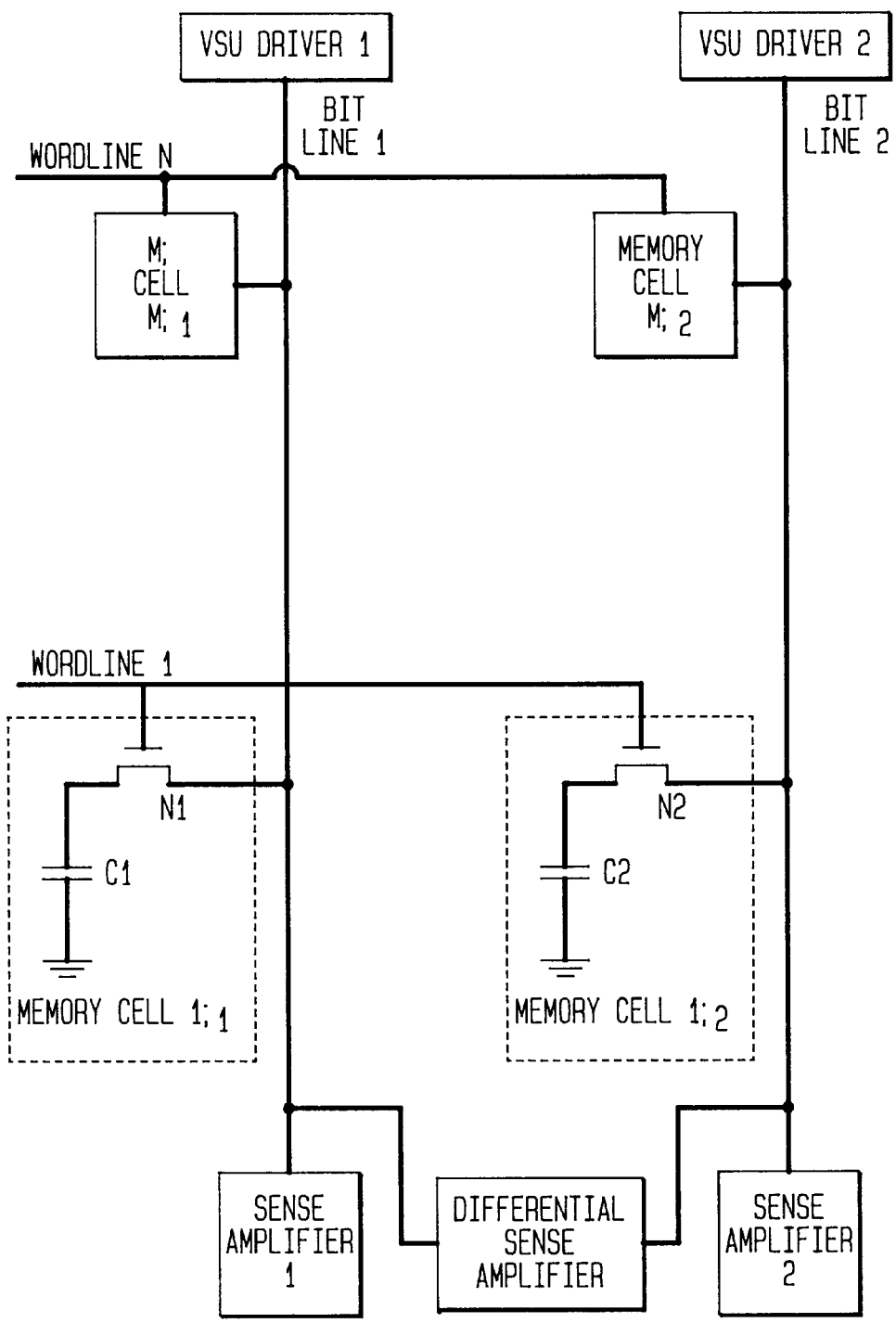
FIG. 12 shows an "analog" memory in accordance with the invention.

The subject of the invention can be applied to an "analog" memory cell which stores a range of voltage/charge. FIG. 12 shows a section of a DRAM memory that will be used to illustrate how the invention may be applied to an "analog" memory cell. The write operation of the memory will be discussed first.

Write Operation: When wordline1 is active (high), VSU Driver1 writes a "0", "0+", "1−", or "1" onto the capacitor C1. In this memory cell arrangement consisting of capacitor C1 and transistor N1, the capacitor C1 can only store voltages equal to or less than VC1=Vwordline1−Vthreshold of transistor N1. Thus a "1" is assigned to the maximum voltage VC1 while "0", "0+", and "1−" are assigned to fractional values of VC1 (e.g. "0"=0, "0+"=0.2*VC1, "1−"= 0.8*VC1, and "1" =VC1). A value is simultaneously written into the memory cell 1;2 consisting of capacitor C2 and transistor N2 by VSU Driver2.

Read Operation: When wordline1 is active and the VSU drivers are inactive (high impedance), the memory cells, 1;1 and 1;2, source charge to the bitlines which are precharged low. Sense amplifiers 1 and 2 detect the boolean values driven onto the bitlines 1 and 2 while the differential sense amplifier resolves the difference between the boolean pair "0+" and "0" ("0" and "0+") or the boolean pair "1−" and "1" ("1" and "1−").

ROM embedded into RAM

In FIG. 12 if C1's capacitance is made larger than C2, C1 will hold more charge than C2 for a "1" stored at a specific voltage. When a "1" is read out of both memory cells, 1;1 and 1;2, bit line1 will rise to a higher voltage than bit line2, and thus the differential sense amplifier will detect C1>C2 which for the sake of argument produces a "1" on the output of the differential sense amplifier. If the capacitance values were swapped, the differential sense amplifier would detect C1<C2 which would produce a "0" on output of the differential sense amplifier. This example illustrates how a ROM cell can be built on top of two "analog" memory cells which store boolean values "0" and "1". The differential signal in a sense is continuously superimposed on the boolean signals by the physical difference in cell capacitances.

While the invention has been described in particular with respect to preferred embodiments thereof, it will be understood by those skilled in the art that modifications to the disclosed embodiments can be effected without departing from the spirit and scope of the invention.

Figure 13:
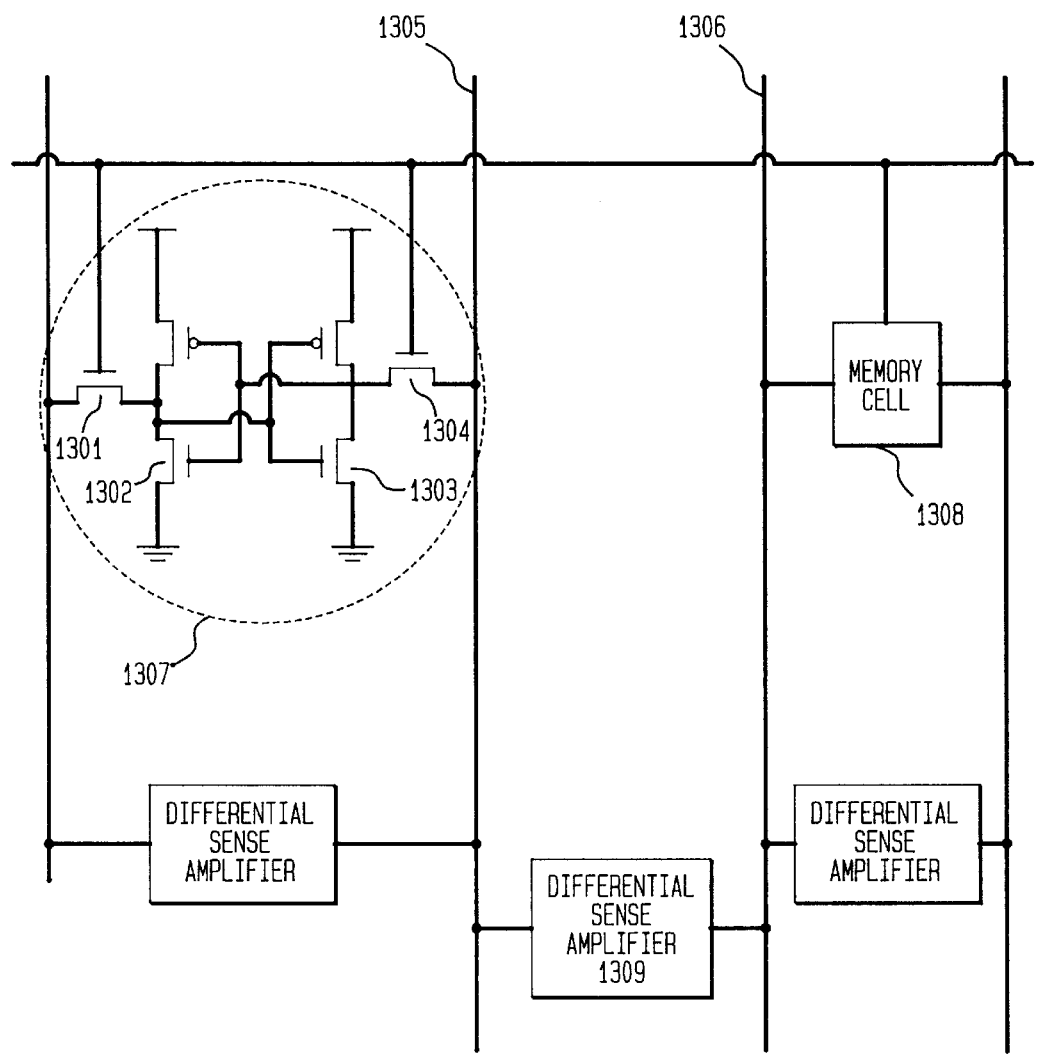
FIG. 13 shows two six-transistor SRAM cells configured in accordance with the invention.

The invention may be applied to a differential SRAM cell (i.e., six transistor cells; or a four transistor, two resistor load cell) with the following additions. Referring to FIG. 13, given two such adjacent cells 1307 and 1308, permanent data can be built into the physical structure of these cells, wherein half the information resides in one cell and half in the other. The information is built into the cells by adjusting the size of the access transistors 1301, 1304 or pull down devices 1302 and 1303. (Note that each cell also shares data with another data cell.) In a typical case, a 0 and 1 must be read from adjacent cells so that both adjacent bit lines 1305 and 1306 are pulled down.

In accordance with the invention, Differential sense amplifier 1309 detects differences in pull down rates (transistor sizings determine these rates) on adjacent bit lines 1305 and 1306. Note that physical adjacency is not necessary.

We claim:

1. A method for dynamically adjusting thresholds of receiver circuits, comprising:

detecting a pair of arriving signals at a threshold adjust circuit;

generating at the threshold adjust circuit a threshold adjust signal based on the arriving signals;

receiving the pair of arriving signals with a pair of signal receivers;

adjusting the threshold of the pair of signal receivers using the threshold adjust signal to maximize noise margins of the arriving signals; and detecting the arriving signals at the signal receivers using the new thresholds, wherein said pair of arriving signals includes Boolean data and Boolean data with superimposed differential signals.

2. The method of claim 1, further comprising:

confining the state-space of arriving signals such that if either a 1 or 1⁻ appears on a signal wire, a high 1 must be present within the pair, and if either a 0 or 0⁺ appears on a signal wire, a low zero must be present within the pair.

3. The method of claim 1, wherein said step of detecting at the threshold adjust circuit includes detecting one of voltage and current levels of said arriving signals.

4. The method of claim 1, wherein said noise margin is at least (Vdd−Vdiff)/2, wherein Vdd is at a power supply voltage level and Vdiff is a differential voltage level of two signals which are equal in a Boolean sense.

5. In a device for propagating data signals represented by Boolean data and Boolean data with superimposed differential signals, a circuit for dynamically adjusting data receiver thresholds, comprising:

a gate for detecting said data signals ($K_1$, $K_2$,) and outputting an adjust threshold (AT) signal; and a data receiver for receiving said data signals ($K_1$, $K_2$,), having means for determining Boolean values of said data signals, said data receiver further having a threshold adjust input for receiving said AT signal for threshold adjustment based on said AT signal, wherein said Boolean data includes a logic '1' (VDD) and a differential signal (Vdiff), wherein the threshold is $$\frac{VDD + V\text{diff}}{2} \text{ if AT = '0'}$$

and $$\frac{VDD - V\text{diff}}{2} \text{ if AT = '1'}.$$

6. The circuit of claim 5, wherein said gate is a logical-OR gate.

7. In a device for propagating data signals represented by Boolean data and Boolean data with superimposed differential signals, a circuit for dynamically adjusting data receiver thresholds, comprising:

a gate for detecting said data signals ($K_1$, $K_2$,) and outputting an adjust threshold (AT) signal; and a data receiver for receiving said data signals ($K_1$, K2,), having means for determining Boolean values of said data signals, said data receiver further having a threshold adjust input for receiving said AT signal for threshold adjustment based on said AT signal, wherein said data receiver includes first, second and third pulldown transistors ($N_1$, $N_2$,$N_3$), and second pull down transistors are commonly connected at one node and commonly connected at their gate inputs to receive said data signal, said third pulldown transistor ($N_3$) having its gate connected to said adjust threshold (AT), input and commonly connected to the second pull down transistor at another node.

8. The circuit of claim 7, further including a pull-up transistor ($P_1$), wherein said pull down transistors $N_1$, $N_2$, $N_3$ are sized disproportionally to $P_1$ so that a lower threshold is present when AT is at '1' and a higher threshold is present when AT is at '0'.

* * * * *